United States Patent
Kurian et al.

(10) Patent No.: US 10,846,619 B2
(45) Date of Patent: Nov. 24, 2020

(54) USING MACHINE LEARNING SYSTEM TO DYNAMICALLY MODIFY DEVICE PARAMETERS

(71) Applicant: Bank of America Corporation, Charlotte, NC (US)

(72) Inventors: Manu Kurian, Dallas, TX (US); Abhishek Nagpal, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 502 days.

(21) Appl. No.: 15/705,335

(22) Filed: Sep. 15, 2017

(65) Prior Publication Data
US 2019/0087745 A1   Mar. 21, 2019

(51) Int. Cl.
*G06N 20/00*   (2019.01)
*G06F 9/50*   (2006.01)
*G06Q 40/00*   (2012.01)

(52) U.S. Cl.
CPC .............. *G06N 20/00* (2019.01); *G06F 9/50* (2013.01); *G06Q 40/00* (2013.01)

(58) Field of Classification Search
CPC ............. H04W 24/10; H04W 36/0083; H04W 36/00837; H04W 36/0088; H04W 36/0094; H04W 36/18; H04W 36/30; G06F 21/34; G06F 21/316; G06F 21/552; G06F 2221/2111; G06F 9/50; G06F 9/5005; G06F 9/5061; G06F 9/5094; G06N 20/00; G06N 20/10; G06N 20/20
See application file for complete search history.

(56) References Cited

U.S. PATENT DOCUMENTS

| | | |
|---|---|---|
| 7,885,890 B2 | 2/2011 | Haertel |
| 8,132,713 B2 | 3/2012 | Kekicheff et al. |
| 8,135,624 B1 | 3/2012 | Ramalingam et al. |
| 8,140,403 B2 | 3/2012 | Ramalingam et al. |
| 8,255,284 B1 | 8/2012 | Ramalingam et al. |
| 8,341,029 B1 | 12/2012 | Ramalingam et al. |
| 8,838,474 B2 | 9/2014 | Macy et al. |

(Continued)

OTHER PUBLICATIONS

Bailey Reutzel, "How AI is poised to take a bigger role in payments", www.paymentsource.com, Mar. 21, 2017, downloaded on Sep. 12, 2017 at <https://www.paymentssource.com/news/how-ai-is-poised-to-take-a-bigger-role-in-payments>.

*Primary Examiner* — Jean A Gelin
(74) *Attorney, Agent, or Firm* — Banner & Witcoff, Ltd.; Michael A. Springs

(57) ABSTRACT

Systems for dynamically modifying one or more parameters of an event processing device are provided. In some examples, a system may receive data, such as data from a mobile device of a user. The data may include current location information of the mobile device. In some examples, additional data, may also be received. In some examples, one or more machine learning datasets may be used to determine whether a parameter of the event processing device should be modified. If so, an instruction to modify the parameter of the event processing device may be generated and executed. After modifying the parameter, additional data may be received and analyzed to determine whether a triggering event has occurred. If not, the parameter may remain in the modified state. If a triggering event has occurred, the parameter may be further modified.

18 Claims, 12 Drawing Sheets

(56) References Cited

U.S. PATENT DOCUMENTS

| | | | |
|---|---|---|---|
| 9,047,617 B2 | 6/2015 | Sanchez et al. | |
| 9,324,091 B2 | 4/2016 | Randell et al. | |
| 9,342,828 B2 | 5/2016 | Sanchez et al. | |
| 10,489,457 B1* | 11/2019 | Wulf | G06F 16/2457 |
| 2010/0262537 A1 | 10/2010 | Park | |
| 2013/0325681 A1* | 12/2013 | Somashekar | H04M 15/8011 |
| | | | 705/35 |
| 2014/0317734 A1* | 10/2014 | Valencia | G06F 21/316 |
| | | | 726/22 |
| 2014/0358828 A1* | 12/2014 | Phillipps | G06N 20/00 |
| | | | 706/12 |
| 2016/0104129 A1 | 4/2016 | Sadarla et al. | |
| 2017/0006509 A1* | 1/2017 | Viering | H04W 36/0088 |
| 2017/0098197 A1* | 4/2017 | Yu | G06Q 30/02 |
| 2018/0331881 A1* | 11/2018 | Beattie, Jr. | H04W 4/70 |
| 2019/0303807 A1* | 10/2019 | Gueye | G06Q 10/02 |

* cited by examiner

USING MACHINE LEARNING SYSTEM TO DYNAMICALLY MODIFY DEVICE PARAMETERS

BACKGROUND

Aspects of the disclosure relate to electrical computers, systems, and machine learning. In particular, one or more aspects of the disclosure relate to using machine learning to modify a parameter of an event processing device based on received data.

It can often be difficult to anticipate when available resources will be insufficient. In particular, unexpected obligations often arise and require reallocation of resources. However, often, reallocating the necessary resources can be time consuming and inefficient. In some examples, even if resources can be reallocated, the reallocated resources may not arrive in a timely manner. Accordingly, it would be advantageous to use machine learning to anticipate when an obligation may arise and automatically, in real-time, adjust parameters of event processing devices in order to accommodate the obligation.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with modifying parameters of an event processing device in real-time.

In some examples, a system, computing platform, or the like, may receive data, such as data from a mobile device of a user. In some examples, the data may include current location information received from a global positioning system (GPS) of the mobile device. In some examples, additional data, such as historical data, event processing data associated with an event processing device, and the like, may be received. In some examples, one or more machine learning datasets may be used to determine whether a parameter of the event processing device should be modified. In some arrangements, the machine learning datasets may also be used to determine a type of modification, extent of modification, and the like.

In some arrangements, an instruction or command to modify the parameter of the event processing device may be generated and executed to modify the parameters. After modifying the parameter, additional data may be received and analyzed. In some examples, additional data may include current location data of the mobile device, events processed since the modification was implemented, and the like. The additional data may be analyzed to determine whether a triggering event has occurred. If not, the parameter may remain in the modified state. If a triggering event has occurred, the parameter may be further modified. In some examples, one or more machine learning datasets may be used to determine whether the parameter should be further modified, a type of modification, an extent of modification, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
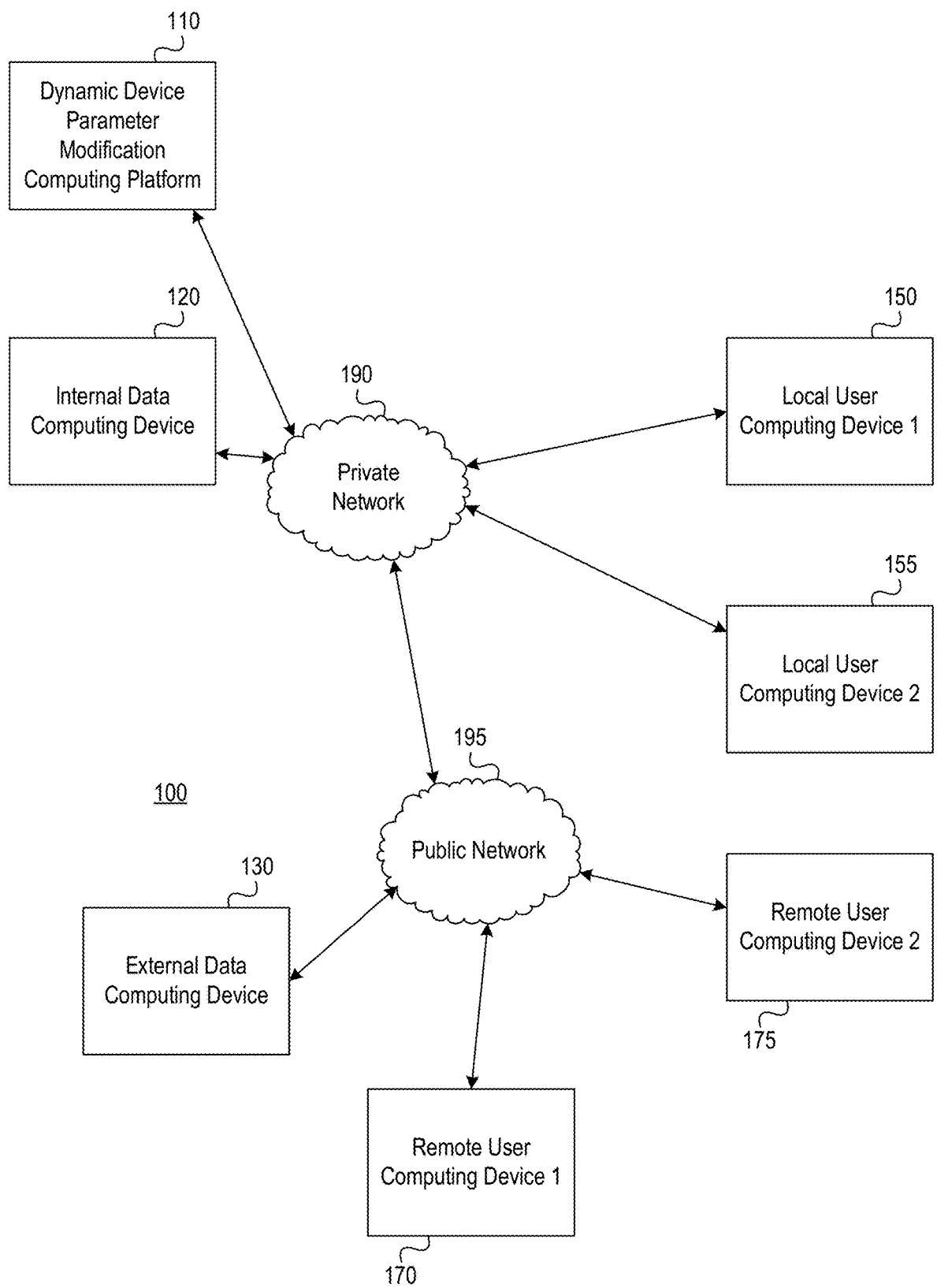
FIGS. 1A and 1B depict an illustrative computing environment for implementing dynamic device parameter modification functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to determine a modification to a parameter of a device, such as an event processing device. The modification may be a temporary modification or, in some examples, may be permanent. In some examples, the parameter may remain modified until a triggering event is detected.

As mentioned above, allocating resources can be difficult when unforeseen or unexpected issues or obligations arise. For instance, ensuring sufficient funds are available should an unexpected obligation occur may require adjustment of various resource pools, requests for additional resources, and the like. This may be time consuming, inefficient, and any additional resources might not arrive in a timely manner.

Accordingly, aspects described herein provide for dynamic device parameter modifications based on, for example, machine learning. In some examples, machine learning datasets may be generated linking previous historical events or requests for event processing (e.g., via a device, such as an event processing device) with a location of a user, date, time, or the like. In some examples, data associated with a user of a device, such as an event processing device, may be received and analyzed. The machine learning datasets may be used to predict when additional resources may be needed. Accordingly, in order to accommodate the need for additional resources, one or more parameters of the event processing device may be modified. In some examples, the machine learning datasets may be used to determine a type of modification, extent of modification, and the like.

In some arrangements, after modifying the parameter of the event processing device, additional data may be received. The additional data may be analyzed, e.g., in real-time, to determine whether a triggering event has occurred. If not, the modified parameter may remain in the modified state or condition. If a triggering event has occurred, further modification of the parameter may be executed. For instance, the parameter may be modified to return to a previous or original value. In another example, the parameter may be modified to another value, different from the original value and the modified value.

These and various other arrangements will be discussed more fully below.

Figure 1B:
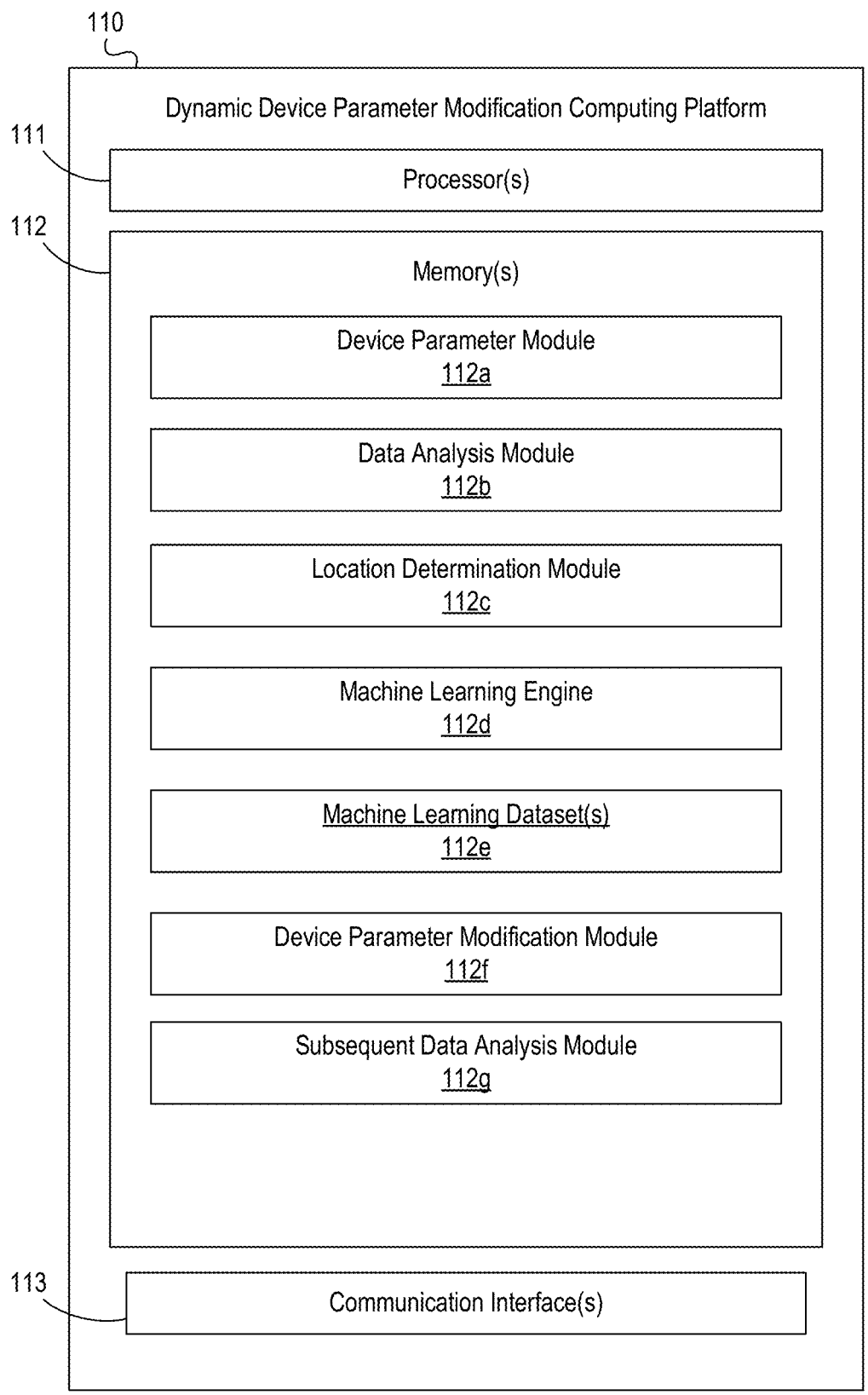

FIGS. 1A and 1B depict an illustrative computing environment for implementing and using a system for dynamically modifying device parameters in accordance with one or more aspects described herein. Referring to FIG. 1A, computing environment 100 may include one or more computing devices and/or other computing systems. For example, computing environment 100 may include a dynamic device parameter modification computing platform 110, an internal data computing device 120, an external data computing device 130, a first local user computing device 150, a second local user computing device 155, a first remote user computing device 170, and a second remote user computing device 175.

Dynamic device parameter modification computing platform 110 may be configured to host and/or execute a machine learning engine to provide dynamic device parameter modification functions. In some examples, data may be received from one or more devices, such remote user computing device 170, remote user computing device 175, internal data computing device 120, and/or external data computing device 130. The received data may be analyzed, for instance, in real-time or near real-time to evaluate parameters associated with a device, such as an event processing device. In some examples, an event processing device may include a payment device, such as a debit card, credit card, or the like. In other examples, a device may include an online or mobile payment system. In still other examples, an event processing device may include an account associated with a user, or the like. In some arrangements, a parameter may include one or more features, limits, or the like, associated with the event processing device.

In some examples, the data may be analyzed using machine learning to determine whether one or more parameters of the device should be modified. If so, a modification may be made. For instance, an instruction or command to modify one or more parameters may be transmitted to the device, or system associated with managing the device, and the modification may be implemented. In some examples, the modification may remain in place until a triggering event occurs, such as expiration of a time period, analysis of data indicates the modification is no longer needed, or the like.

Internal data computing device 120 may be configured to store, transmit, and/or receive data associated with one or more internal data or computer systems. For instance, an entity implementing the dynamic device parameter modification computing platform 110 may store data associated with various users, event processing device parameter information, account information, historical transaction or other user data, user behavioral information associated with a device, and the like. This information may be transmitted, via the internal data computing device 120, to the dynamic device parameter modification computing platform 110 and may be used to generate one or more machine learning datasets, determine whether a modification should be made, determine a type or extent of modification, determine whether a further modification should be made, and the like.

External data computing device 130 may be configured to store, transmit, and/or receive data associated with one or more data or computer systems external to the entity implementing the dynamic device parameter modification computing platform 110. For instance, data, such as publicly available data, transaction data, user demographic data, social media data, vehicle sensor data, and the like, may be transmitted, via the external data computing device 130, from one or more data or computer systems, to the dynamic device parameter modification computing platform 110 and may be used to generate one or more machine learning datasets, determine whether a modification should be made, determine a type or extent of a modification, determine whether additional modifications should be made, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by dynamic device parameter modification computing platform 110, to establish rules or limits associated with the dynamic device parameter modification computing platform 110, and the like.

The remote user computing devices 170, 175 may be used to communicate with, for example, dynamic device parameter modification computing platform 110, receive and display notifications, transmit data, such a global positioning system (GPS), sensor, or other data to the dynamic device parameter modification computing platform 110 for analysis and use in determining whether a modification should be made, a type or extend of modification, whether additional modifications should be made, and the like.

In one or more arrangements internal data computing device 120, external data computing device 130, local user computing device 150, local user computing device 155, remote user computing device 170, and/or remote user computing device 175 may be any type of computing device or combination of devices capable of performing the particular functions described herein. For example, internal data computing device 120, external data computing device 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic device parameter modification computing platform 110. As illustrated in greater detail below, dynamic device parameter modification computing platform 110 may include one or more computing devices configured to perform one or more of the functions described herein. For example, dynamic device parameter modification computing platform 110 may include one or more computers (e.g., laptop computers, desktop computers, servers, server blades, or the like).

As mentioned above, computing environment 100 also may include one or more networks, which may interconnect one or more of dynamic device parameter modification computing platform 110, internal data computing device 120, external data computing device 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic device parameter modification computing platform 110, internal data computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic device parameter modification computing platform 110, internal data computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic device parameter modification computing platform 110, internal data computing device 120, local user computing device 150, local user computing device 155) with one or more networks and/or computing devices that are not associated with the organization. For example external data computing device 130, remote user computing device 170, and/or remote user computing device 175 might not be associated with an organization that operates private network 190 (e.g., because external data computing device 130, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the Internet) that connect external data computing device 130, remote user computing device 170 and remote user computing device 175 to private network 190 and/or one or more computing devices connected thereto (e.g., dynamic device parameter modification computing platform 110, internal data computing device 120, local user computing device 150, local user computing device 155).

Referring to FIG. 1B, dynamic device parameter modification computing platform 110 may include one or more processors 111, memory 112, and communication interface 113. A data bus may interconnect processor(s) 111, memory 112, and communication interface 113. Communication interface 113 may be a network interface configured to support communication between dynamic device parameter modification computing platform 110 and one or more networks (e.g., private network 190, public network 195, or the like). Memory 112 may include one or more program modules having instructions that when executed by processor(s) 111 cause dynamic device parameter modification computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic device parameter modification computing platform 110 and/or by different computing devices that may form and/or otherwise make up dynamic device parameter modification computing platform 110.

For example, memory 112 may have, store, and/or include a device parameter module 112a. Device parameter module 112a may store instructions and/or data that may cause or enable the dynamic device parameter modification computing platform 110 to receive data associated with one or more parameters of an event processing device. For instance, the device parameter module 112a may receive data (e.g., from one or more sources such as internal data computing device 120, external data computing device 130, or the like) associated with a type of event processing device (e.g., debit card, credit card, online or mobile payment system, or the like), user information associated with the event processing device, as well as one or more parameters of the event processing device (e.g., spending or credit limits, maximum withdrawal, limits on number of uses in a predetermined time period, or the like). Various other parameter information may be received without departing from the invention.

Memory 112 may further have, store, and/or include a data analysis module 112b. Data analysis module 112b may store instructions and/or data that may cause or enable the dynamic device parameter modification computing platform 110 to receive data from one or more sources (e.g., internal data computing device 120, external data computing device 130, local user computing device 150, local user computing device 155, remote user computing device 170, remote user computing device 175, or the like). In some examples, the data may include historical data associated with an event processing device, user of an event processing device, or the like. The data may further include current device information (e.g., how often used, current account balance information, and the like). The data may further include data associated with historical events processed using the event processing device (e.g., historical transaction information, and the like). The data may be analyzed for use in evaluating whether one or more modifications should be made.

Memory 112 may further have, store and/or include a location determination module 112c. Location determination module 112c may store instructions and/or data that may cause or enable the dynamic device parameter modification computing platform 110 to receive location information, such as GPS data, from, for example a user device (e.g., remote user computing device 170, remote user computing device 175, or the like). The location determination module 112c may receive the GPS or other location data and may determine, in real-time, a current location of a user, e.g., based on the current location of the remote user computing device 170, 175 associated with the user. This information may be used to determine whether one or more modification should be made.

The dynamic device parameter modification computing platform 110 may further have, store, and/or include a machine learning engine 112d and machine learning datasets 112e. Machine learning engine 112d and machine learning datasets 112e may store instructions and/or data that cause or enable dynamic device parameter modification computing platform 110 to evaluate analyzed data and/or location data to determine whether a parameter modification should be implemented, a type or extent of a parameter modification, whether additional parameter modifications should be made, and the like. The machine learning datasets 112e may be generated based on analyzed data (e.g., data from previously received data, data from internal data computing device 120, data from external data computing device 130, and the like), raw data, and/or received from one or more outside sources.

The machine learning engine 112d may receive data (e.g., data from internal data computing device 130, external data computing device 130, analyzed data from data analysis module 112b, location data from location determination module 112c, and the like) and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e.

The machine learning datasets 112e may include machine learning data linking historical event processing data to location data and/or date, time information. For instance, data from previous events processed (e.g., transactions processed using a device) may be linked to a location of the event, data of the event, and/or time of the event. Accordingly, if a similar location is detected at a similar date and time, the system may identify a need for a parameter modification. For example, if a college student purchases books from the campus bookstore in late August or early September and uses an event processing device to process the event, the machine learning data may link a purchase of books, which may be a larger expense than is typically processed using the event processing device, with the date, time, and/or location. Accordingly, upon detecting a similar location, date, or time, the system may modify a parameter of the event processing device, such as a credit limit, to temporarily permit the user to exceed the standard credit limit for the event processing device.

One or more machine learning datasets 112e may also include machine learning data linking data related to historical events processed, location, time, date, and the like, to an amount or extent of a parameter modification. For instance, the machine learning datasets 112e may link the historical data, location data, and the like, to a recommendation to make a parameter modification, as well as to an amount or extent of the parameter modification (e.g., temporarily increase credit limit by $1000, permit 3 additional events to be processed this month, or the like).

In some examples, one or more machine learning datasets 112e may also link historical data, location data, previous modification data, and the like, to a time limit for the modification, a determination that a further modification should be made, the like.

The machine learning datasets 112e may be updated and/or validated based on subsequent data received, for example, after a modification is made.

The machine learning datasets 112e may be used by, for example, a device parameter modification module 112f. Device parameter modification module 112f may store instructions and/or data that may cause or enable the dynamic device parameter modification computing platform 110 to generate an instruction or command to modify one or more parameters of an event processing device. The instruction or command may be transmitted to, for instance, a system storing the parameters of the event processing device, a user computing device, such as remote user computing device 170, 175, or the like, and may be executed to modify the parameter. In some examples, device parameter modification module 112f may also generate instructions or commands to further modify a parameter that was previously modified (e.g., to return the parameter to a previous value, to modify the parameter to a different value, or the like).

Device parameter modification computing platform 110 may further have, store and/or include a subsequent data analysis module 112g. The subsequent data analysis module 112g may have or include instructions and/or data that may cause or enable the device parameter modification computing platform 110 to receive additional data (e.g., data received subsequent to data used to determine whether a modification should be made) which may be used to make further determinations. The data may be received from one or more sources, including, in some examples, internal data sources, external data sources, and the like, such as internal data computing device 120, external data computing device 130, local user computing device 150, 155, remote user computing device 170, 175, or the like. The data may be analyzed and used in conjunction with one or more machine learning datasets 112e to make one or more determinations related to event processing device parameter modifications.

In some examples, the subsequent data analysis module 112g may receive data and analyze the data to determine whether a triggering event has occurred. For instance, the subsequent data analysis module 112g may receive and analyze it to determine whether a triggering event, such as a predefined time period has lapsed, a balance of an account has reached a threshold, a payment or predetermined number of payments have been made, or the like, has occurred. If so, a recommendation for additional modification to the parameter may be made.

FIGS. 2A-2F depict an illustrative event sequence for implementing and using dynamic device parameter modification functions in accordance with one or more aspects described herein. The events shown in the illustrative event sequence are merely one example sequence and additional events may be added, or events may be omitted, without departing from the invention.

Figure 2A:
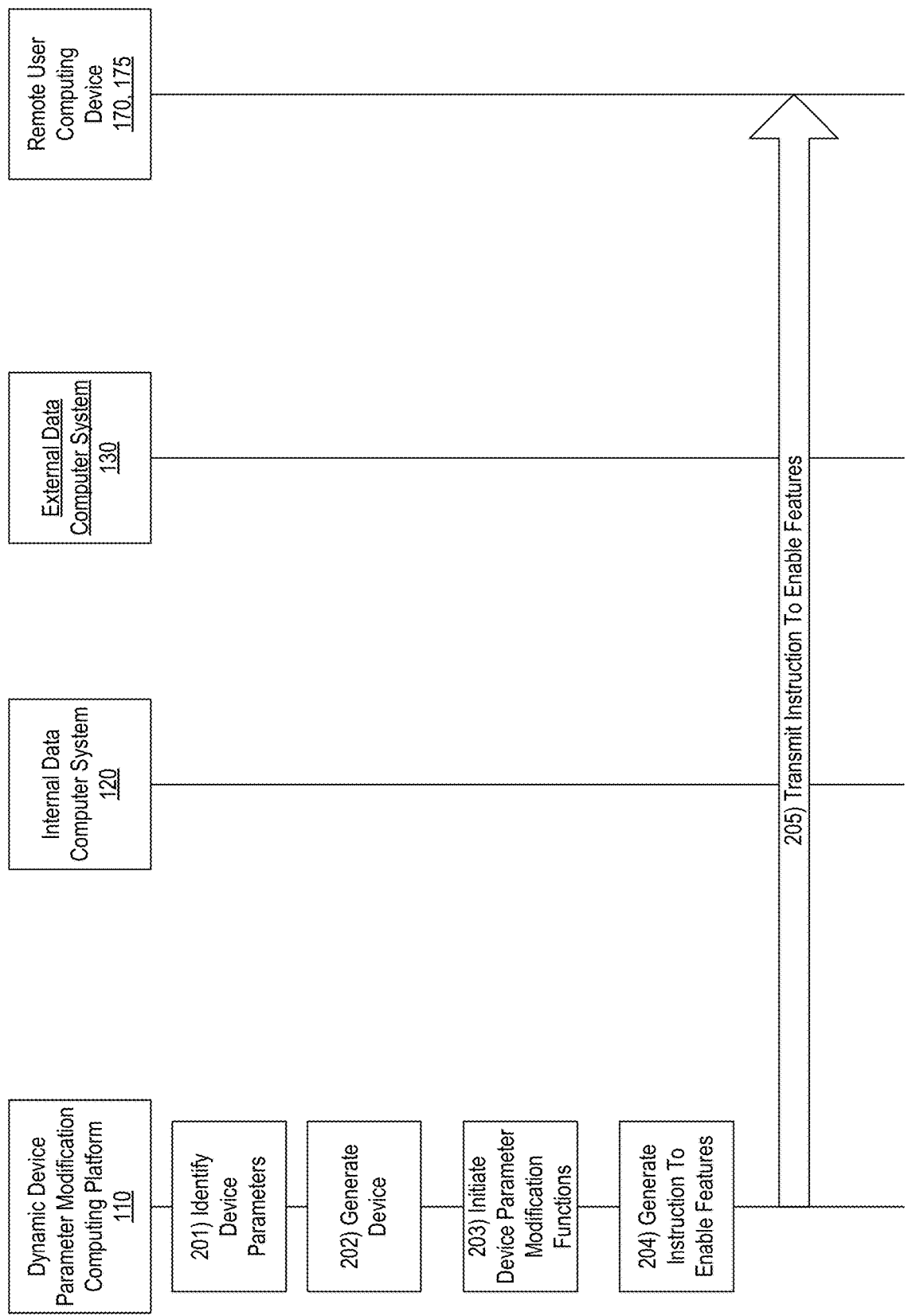
FIGS. 2A-2F depict an illustrative event sequence for implementing dynamic device parameter modification functions in accordance with one or more aspects described herein.

Referring to FIG. 2A, at step 201, event processing device parameters may be determined or identified. As discussed herein, an event processing device may include devices such as a debit card, credit card, online or mobile payment system, account of a user, or the like. In some examples, events or processed events may include transactions such as purchases, withdrawals, deposits, and the like. As also discussed herein, event processing device parameters may include features or limits associated with the device (e.g., maximum withdrawal or event amount, maximum number of events in a predetermined time period, credit limit, or the like). In some examples, the parameters for a device may be retrieved from, for example, a database storing parameters. In other examples, they may be identified for the event processing device based on characteristics of the user associated with the event processing device, such as annual income, credit history, credit score, age, and the like.

In step 202, an event processing device may be generated. In some examples, step 202 may be optional (e.g., if a device has already been generated). Alternatively, if the event processing device is newly requested, the system may generate the device. Generating the event processing device may include generating a record in one or more databases including information associated with the device (e.g., user, account, parameter values, and the like). In some arrangements, generating the event processing device may further include transmitting an instruction to one or more systems to generate or manufacture a physical device having the parameters identified in step 201.

In step 203, device parameter modification functions may be initiated or activated. For instance, device parameter modification functions may be initiated for the generated device at the dynamic device parameter modification computing platform 110. Initiating or activating these functions may include identifying one or more user computing devices associated with the user of the event processing device (e.g., based on information provided by the user, based on computing device identifiers captured during a registration process, or the like). Further, initiating and/or activating the functions may include retrieving data from one or more computing devices and/or initiating data requests to be transmitted to one or more computing devices.

In step 204, an instruction to enable features of a user computing device, such as remote user computing device 170, 175, may be generated. In some examples, the instruction may include an instruction to enable one or more sensors in the user computing device, enable location determination services associated with the user computing device, or the like. In step 205, the instruction to enable features may be transmitted to the user computing device, such as remote user computing device 170, 175.

Figure 2B:
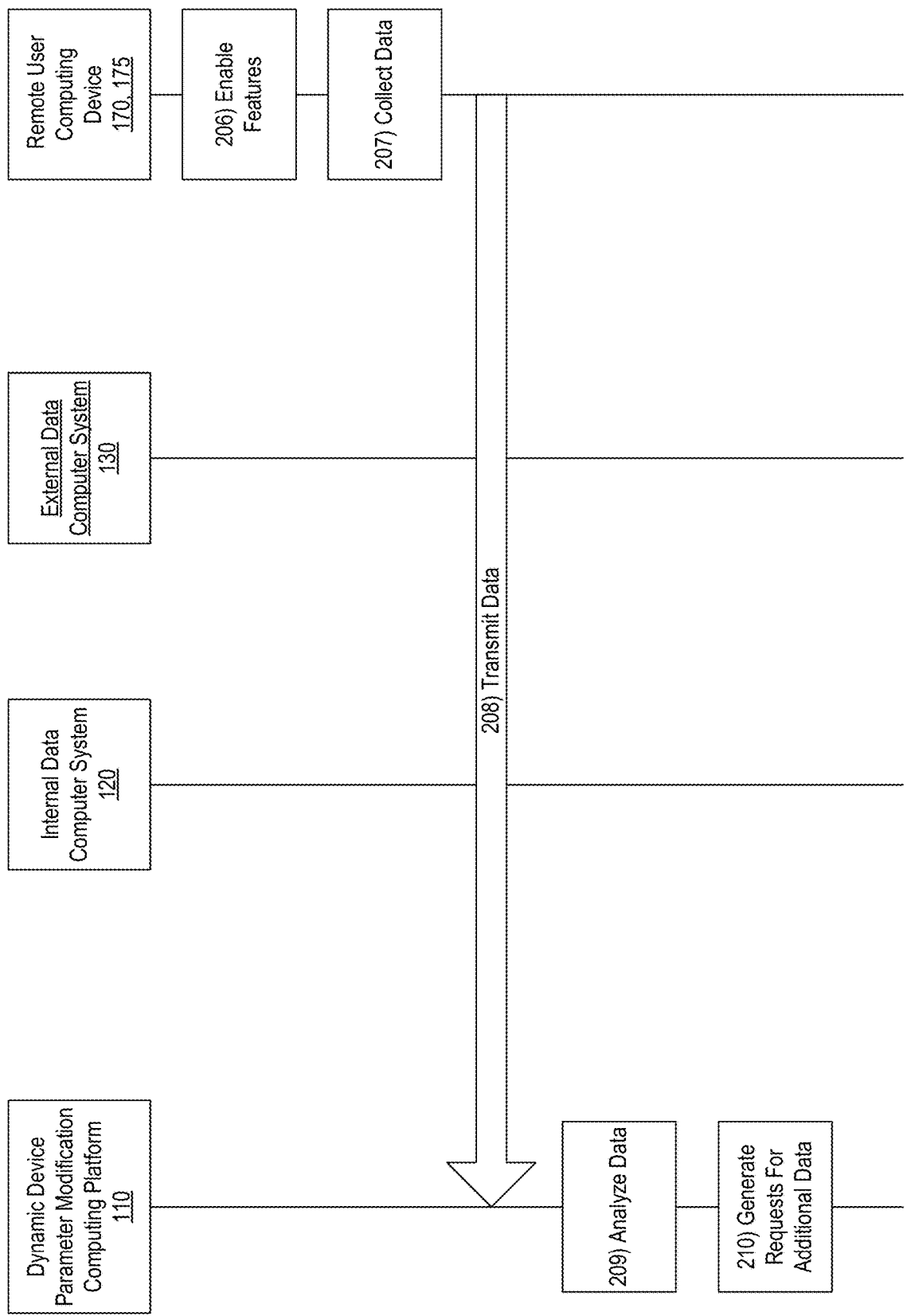

With reference to FIG. 2B, in step 206, the instruction to enable features may be executed by the remote user computing device 170, 175 and the features may be enabled by the remote user computing device 170, 175.

In step 207, data may be collected by one or more sensors or other data collection components of the remote user computing device 170, 175. For instance, data associated with a location of the remote user computing device 170, 175 may be collected. Data associated with other aspects of the device may also be collected, such as usage data from one or more applications executing on the device, other sensor data (e.g., accelerometer data, or the like), and the like may be collected. In some examples, remote user computing device 170, 175 may be a computing device associated with a vehicle and configured to detect operational conditions of a vehicle (e.g., sensors positioned within a vehicle to determine impact, rapid deceleration, and the like, which may indicate an accident or other incident). In step 208, the collected data may be transmitted to the dynamic device parameter modification computing platform 110.

In step 209, the transmitted data may be received and analyzed by the dynamic device parameter modification computing platform 110. In some examples, analysis of the data may include identification of additional data or types of data to be used in one or more evaluations or determination decisions. In step 210, the identified additional data may be used to generate one or more requests for additional data.

Figure 2C:
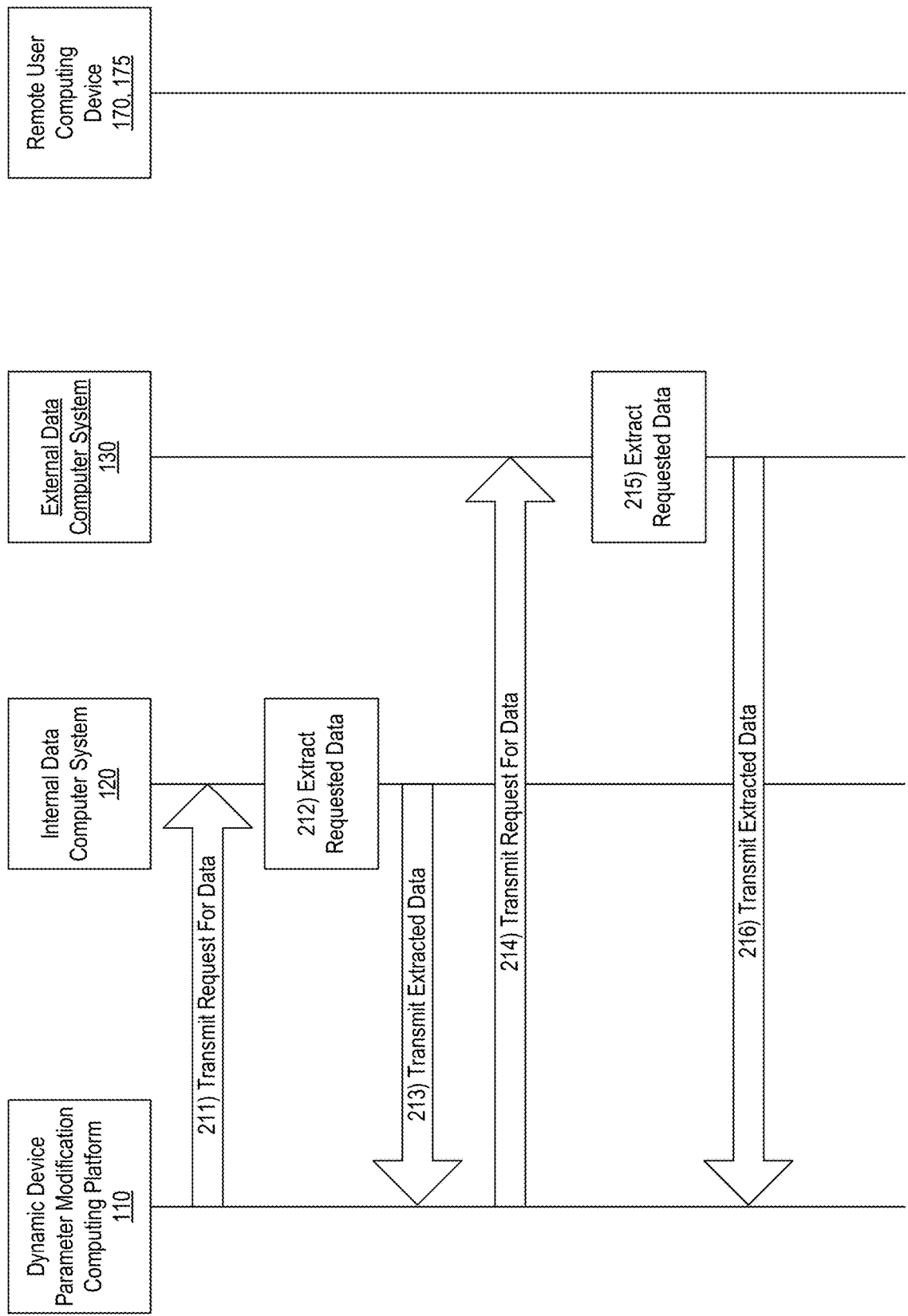

With reference to FIG. 2C, in step 211, a request for additional information may be transmitted to a computing device. For instance, a request for additional information may be transmitted to, for example, internal data computing device 120. In step 212, the requested data may be extracted from one or more databases of the internal data computing device 120. In some examples, the requested data may include, for example, data associated with an account of a user, historical event data, behavioral data, and the like. In step 213, the extracted data may be transmitted to the dynamic device parameter modification computing platform 110.

In step 214, another request for additional data may be transmitted to a computing device. For instance, a request for additional information may be transmitted to external data computing device 130. In some examples, the requests in step 211 and 214 may be transmitted simultaneously or nearly simultaneously.

In step 215, the requested data may be extracted. For instance, the requested data may be extracted from one or more databases. In some examples, the extracted data may include publicly available data, interest rate data, newsfeed data, social media data, location information, and the like. In step 216, the extracted data may be transmitted to the dynamic device parameter modification computing platform 110.

Figure 2D:
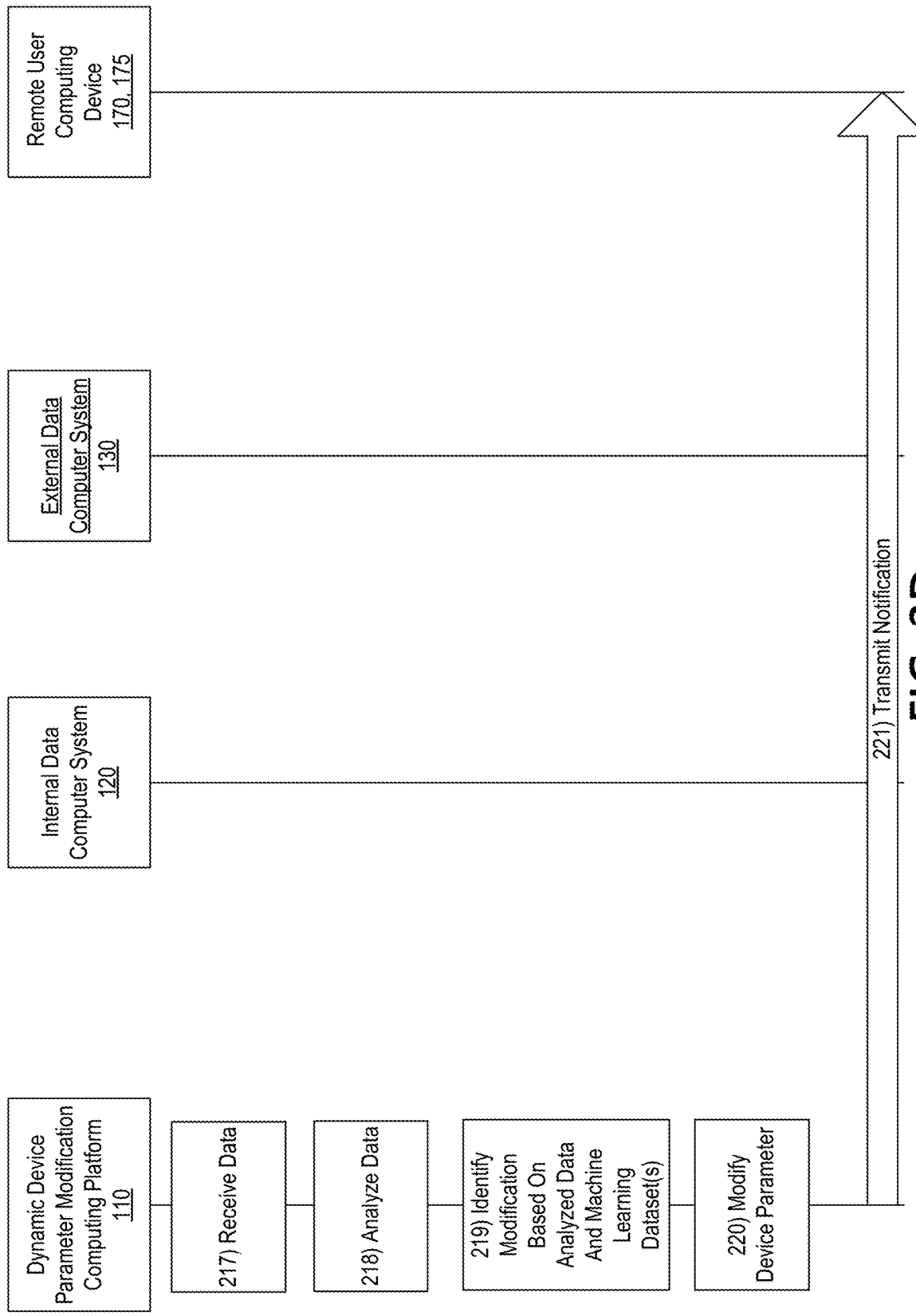

With reference to FIG. 2D, in step 217, the requested additional data may be received by the dynamic device parameter modification computing device 110. In step 218, the received data may be analyzed. For instance, the received additional data, data from the remote user computing device, and the like, may be compared to one or more machine learning datasets to evaluate the data to determine whether a modification should be made.

In step 219, based on the analyzed data, machine learning datasets, and the like, one or more modifications may be identified. In some examples, the identified modification may include a temporary increase in credit limit, a temporary increase in a maximum withdrawal amount, or the like. In step 220, the device parameter may be modified. In some examples, modifying the device parameter may include generating a command or instruction to modify the parameter of the event processing device. The command or instruction may be transmitted to one or more devices or systems and may be executed to modify the parameter.

In some examples, a notification of the modification to the device parameter may be generated and transmitted to the remote user computing device 170, 175 in step 221.

Figure 2E:
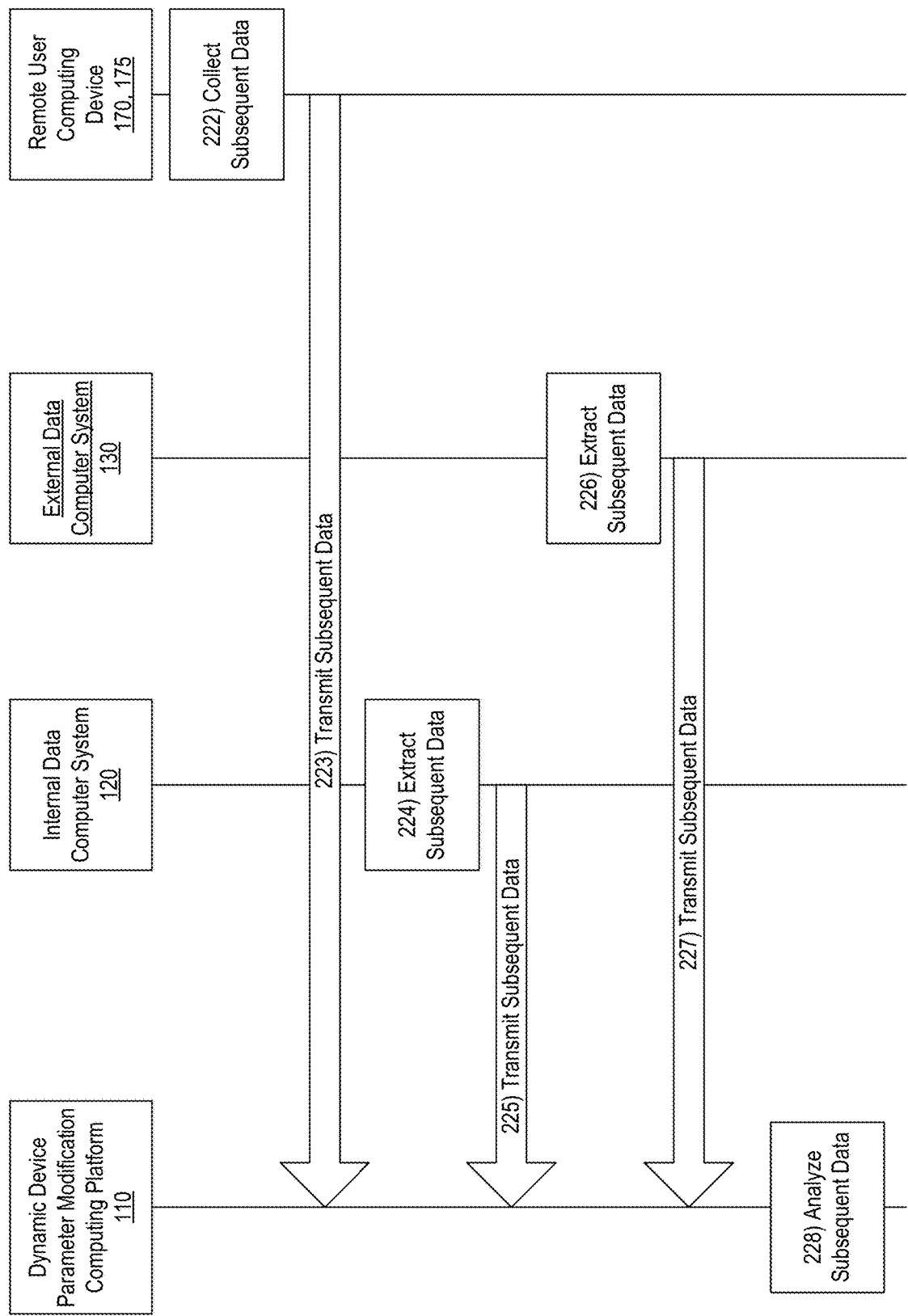

With reference to FIG. 2E, in step 222, subsequent data may be collected by, for instance, remote user computing device 170, 175. For instance, current location or other sensor data information may be collected by the remote user computing device 170, 175. In step 223, the subsequent data may be transmitted to the dynamic device parameter modification computing platform 110.

In step 224, subsequent data may be extracted from one or more databases associated with internal data computing device 120. In some examples, the subsequent data may include updated account information, user transaction or event processing information, or the like. In step 225, the subsequent information may be transmitted to the device parameter modification computing platform 110.

In step 226, subsequent data may be extracted from one or more databases associated with external data computing device 130. In some examples, the subsequent data may include updated other event processing information (e.g., events not processed with device), updating interest rate information, or the like. In step 227, the subsequent information may be transmitted to the device parameter modification computing platform 110.

In step 228, the subsequent information from the remote user computing device 170, 175, internal data computing device 120, and/or external data computing device 130 may be received by the dynamic device parameter modification computing platform 110 and may be analyzed. Analyzing the data may include comparing the data to one or more machine learning datasets.

Figure 2F:
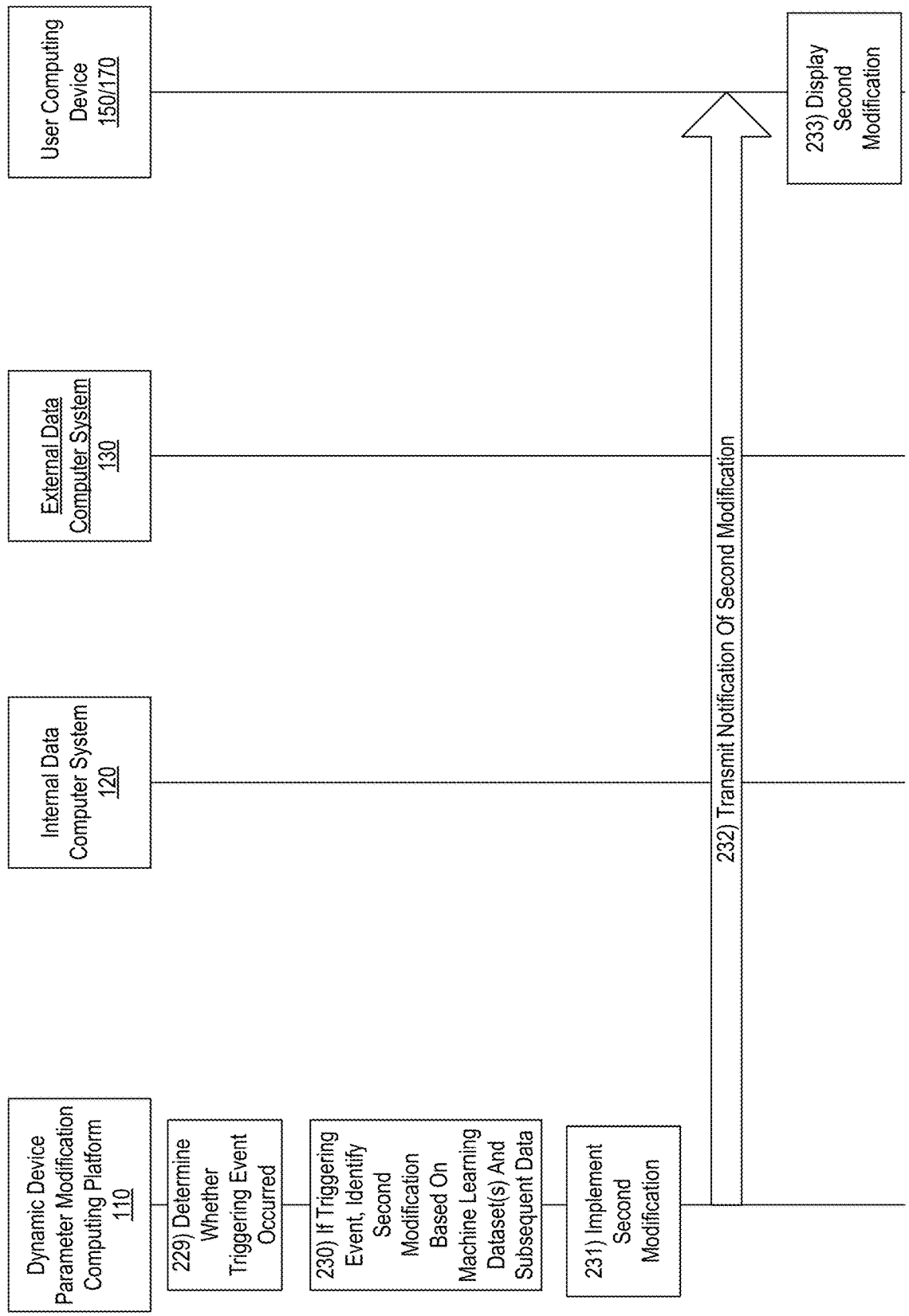

With reference to FIG. 2F, in step 229, the analyzed data may be further analyzed to determine whether a triggering event has occurred. For instance, the data may be evaluated to determine whether a predetermined time period has lapsed (e.g., if the modification was implemented for a predetermined time period), whether the user has reduced a balance on an account associated with the device to a predetermined threshold, or the like.

In step 230, a determination may be made as whether a second modification to the parameter should be made. For instance, based on the determination of whether the triggering event has occurred, as well as the analyzed subsequent data and machine learning datasets, the system may determine whether to further modify the parameter. Further modifying the parameter may include modifying a value of the parameter from the temporary modified value to an original value, to a different value, or the like.

In step 231, if a further modification is identified, the modification may be implemented. Implementing the modification may include transmitting one or more instructions or commands to further modify the parameter of the event processing device.

In step 232, a notification of the second modification may be generated and transmitted to the remote user computing device 170, 175. In step 233, the notification may be displayed on the remote user computing device 170, 175.

Figure 3:
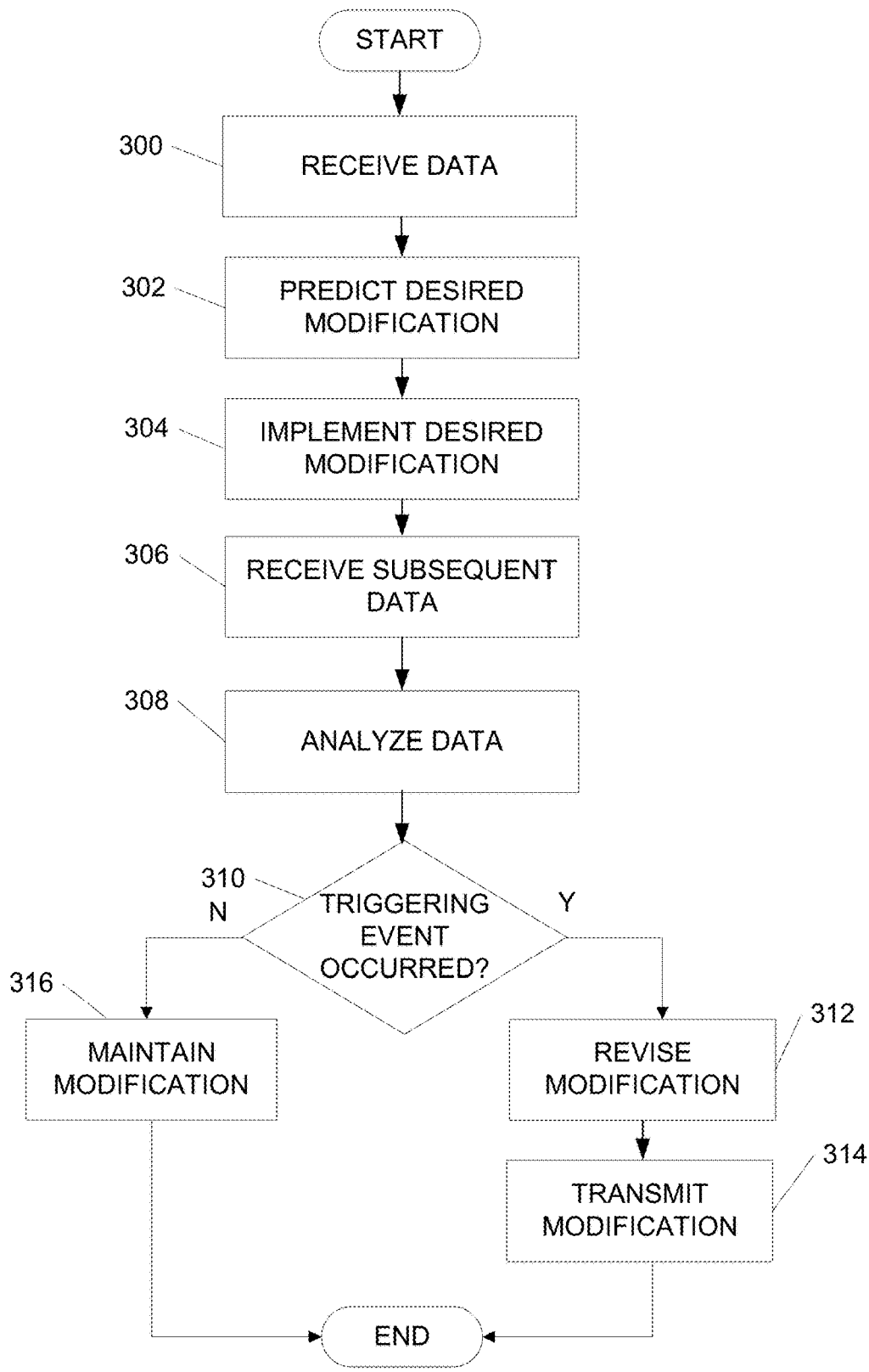
FIG. 3 depicts an illustrative method for implementing and using a system to perform dynamic device parameter modification functions, according to one or more aspects described herein.

FIG. 3 is a flow chart illustrating one example method of implementing a machine learning system for dynamically modifying device parameters according to one or more aspects described herein. The processes illustrated in FIG. 3 are merely some example processes and functions. The steps shown may be performed in a different order, more steps may be added, or one or more steps may be omitted without departing from the invention.

In step 300, data may be received. In some examples, data may be received from, for instance, a computing device of a user, such as remote user computing device 170, 175. In some examples, data received may include time information, date information, location information (e.g., from a global positioning system (GPS)), from one or more sensors within the computing device, from one or more applications executing on the computing device, and the like. In some arrangements, data may also be received from one or more internal data computing devices 120. The data may include account information associated with an event processing device, parameters associated with the event processing device or account, user information, and the like. In some examples, data may also be received from one or more external data computing devices 130.

In step 302, one or more machine learning datasets, as well as the received data, may be used to predict whether a modification to one or more parameters should be implemented, determine a desired modification to one or more parameters of an event processing device associated with the user, and the like. In some examples, the desired modification may include a temporary increase in credit limit, a temporary increase time to make a payment, a temporary increase in a number of permitted events in a predetermined time period, or the like.

In step 304, the predicted desired modification may be implemented. For example, a parameter of the event processing device may be modified from a first condition to a second condition. For instance, the parameter may be a credit limit and the limit may be modified from the first condition of $1000 to a second condition of $1500. In some examples, modifying the parameter may include generating a command or instruction (e.g., by the dynamic device parameter modification computing platform 110) to modify the parameter and transmitting the instruction to one or more additional devices or systems, such as internal data computing device 120, remote user computing device 170, 175, or the like, for execution. For instance, in some examples, internal data computing device 120 may store parameter data associated with an event processing device. If a parameter is modified, the instruction to modify the parameter may be transmitted to the internal data computing device 120 and executed by the internal data computing device 120 to modify the parameter. In some examples, additional data may also be transmitted and stored with the modified parameter, such as one or more rules for a predetermined time period for the modification, type of triggering event to further modify the parameter, or the like.

In step 306, subsequent data may be received. For instance, subsequent data may be received from the remote user computing device 170, 175, internal data computing device 120, external data computing device 130, and the like, and may include types of data similar to those received in step 300. In step 308, the subsequent data may be analyzed, for instance, in real-time.

In step 310, a determination may be made as to whether a triggering event has occurred. In some examples, the determination may be based on the analysis of the subsequent data received (and/or one or more machine learning datasets).

If, in step 310, a triggering event has not occurred, the parameters of the event processing device may be maintained in the current modified state (e.g., in the second condition) in step 316. If, in step 310, a triggering event has occurred, the parameter may be further modified to a condition other than the current condition (e.g., other than the second condition) in step 312. For instance, in some examples, the modified parameter may be further modified to return the parameter to the first condition. In other examples, the parameter may be further modified to a third condition, different from the first condition and the second condition. In step 314, an instruction to further modify the parameter (e.g., to the first condition, to the third condition, or the like) may be executed and transmitted to one or more systems or devices, such as internal data computing device 120, remote user computing device 170, 175, or the like. In some examples, a notification may also be generated and transmitted to, for instance, the remote user computing device 170, 175 and may be displayed on the remote user computing device 170, 175.

Figure 4:
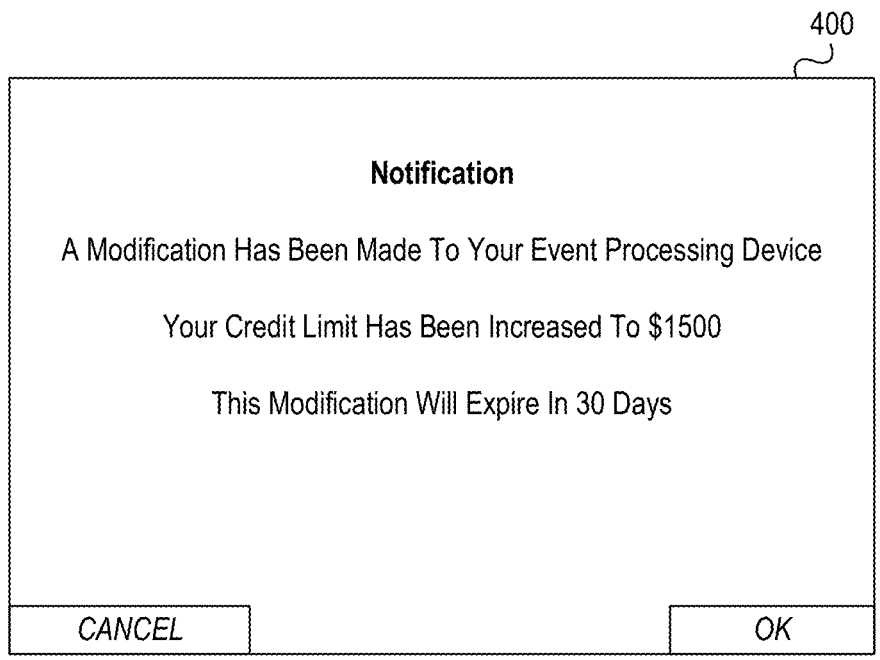
FIG. 4 illustrates one example user interface that may be generated, according to one or more aspects described herein.

FIG. 4 illustrates one example user interface that may be generated in accordance with one or more aspects described herein. The interface 400 may include an indication that a modification to a parameter of a device, such as an event processing device, has been made. In some examples, the modification may be made automatically (e.g., without user input or interaction) based on received and analyzed data. The interface 400 may further include an indication of the type of modification made, extent of modification made, and the like. In some examples, it may include an indication of a triggering event that may cause the modification to be further modified, either back to an earlier value or to a different value. For instance, interface 400 includes an indication that the modification will expire in 30 days. Accordingly, at the end of 30 days, the parameter may revert back to a previous value (e.g., the immediately previous value, an original value, or the like).

Figure 5:
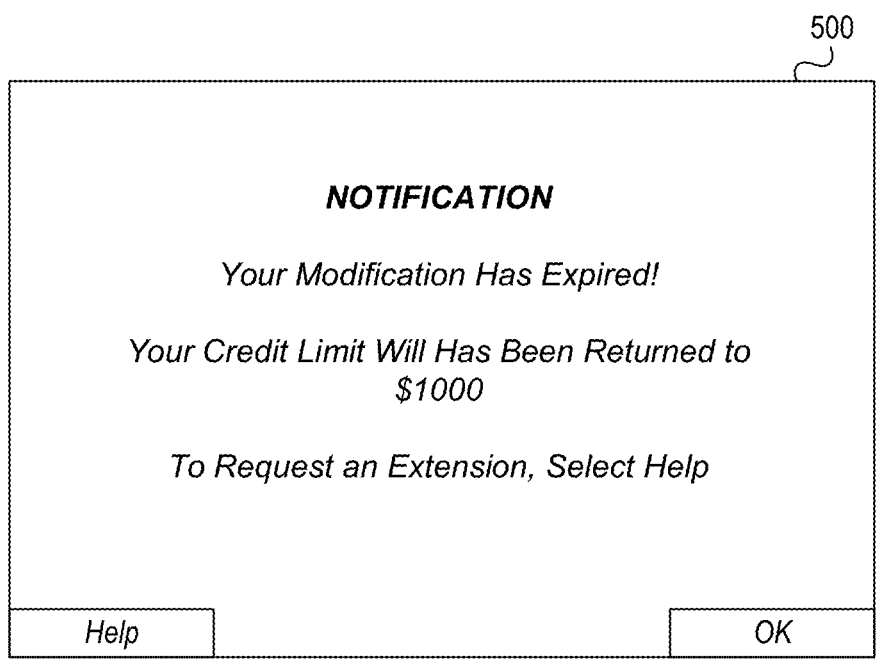
FIG. 5 illustrates another example user interface that may be generated, according to one or more aspects described herein.

FIG. 5 illustrates another example user interface that may be generated in accordance with one or more aspects described herein. The interface 500 may include an indication that a previous modification to a parameter of a device, such as an event processing device, has expired (e.g., that a triggering event has occurred). Accordingly, the interface 500 includes an indication that the parameter will be further modified to a different value (e.g., a previous value, an original value, or the like). Further, the interface 500 may further include an option to request an extension of the modification. For instance, by selecting "help" option the user may request to extend the modified value of the parameter.

As discussed herein, the arrangements described provide for use of machine learning datasets to identify a modification to a parameter of an event processing device, implement the identified parameter modification, and monitor data, in real-time, to determine when additional modifications should be made. As discussed herein, these arrangements allow for temporary modifications of device parameters to aid a user in address unexpected or unforeseen needs or obligations. The modifications may be made in advance or in real-time (e.g., based on a location of a user and an anticipated need) and may be made automatically (e.g., without user request, input, or the like).

Further, in some examples, the modification may be temporary. Accordingly, the temporary modification may aid in addressing the unforeseen obligation of the user, without making a modification that may be unnecessary and possibly detrimental to the user if permanent.

Below are some example parameter modifications, real-time data analysis and monitoring, and further modifications. The below examples are merely some examples and various other issues, modifications and/or efficiency improvements may be used with or generated by the system without departing from the invention.

In some examples, the arrangements described herein may be used to temporarily increase a credit limit on, for instance, a credit card of a user. For instance, if a user has a low credit limit (e.g., $1000), he or she may encounter times when an increased limit would be beneficial. In some arrangements, users have low credit limits (e.g., $1000) to control spending, and the like. Accordingly, a user might not desire to have a higher limit, or might not qualify for a higher limit. However, there may be instances when a higher limit may aid in addressing unforeseen issues.

For instance, to continue the example provided above, if a college student purchases textbooks twice per year (e.g., once in January and once in September), the system may use this historical purchase data to determine, using machine learning, that the user will likely purchase books again in the upcoming year in those months. Accordingly, the system may receive location information from a mobile device of a user and detect that the user is at a bookstore on a college campus. This information, coupled with current date information, and the historical information, may be used to identify that the user may benefit from an increased credit limit (e.g., a parameter modification). Accordingly, the limit on the credit card of the user may be increased from $1000 (first condition) to $1500 (second condition). In some examples, this increase may be temporary and may expire after a predetermined time.

In other examples, the modification may remain in place and subsequent data associated with the user (e.g., spending on the credit card, spending via other event processing devices, payments made, location information, and the like) may be used to determine whether a triggering event has occurred. The occurrence of a triggering event may prompt further modification of the parameter. For instance, if the triggering event is expiration of the predetermined time period, the parameter may be further modified to return the parameter to a previous value.

In another example, if the triggering event is a level of a balance on an account associated with the credit card, the system may determine that the balance is below a predetermined threshold (e.g., in this example, $500) and, based on being below the threshold, the parameter may be further modified to return to a previous value (e.g., $1000).

In yet another example, if the triggering event is a number of payments made on the account associated with the credit card, and the number of payments meets the required threshold, the parameter may be further modified to a value different from the original value ($1000) and the modified value ($1500), such as $1250, to gradually aid in bringing the parameter back to the original value. Accordingly, a parameter may be modified one, two, or more times, in returning the credit limit to the permanent or original value.

In some examples, machine learning may be used to determine a triggering event, evaluate received data to determine whether a triggering event has occurred, identify any subsequent modifications, and the like.

Accordingly, the arrangements described herein include using machine learning for predictive analysis to determine situations or scenarios in which a modification should be made, as well as real-time analysis to determine when a particular modification should be implemented, and real-time analysis of subsequent data to determine whether to maintain a modification, further modify a parameter, an extent of any additional modifications, and the like.

In another example, historical data associated with car accidents, costs associated with accidents, and the like, may be used to generate one or more machine learning datasets. These datasets may be used to analyze data from, for instance, vehicle sensors, sensors in a mobile device of a user in a car, and the like to determine that a vehicle has been in an accident and identify an amount of funds or credit that may be needed for the user to address any medical bills, repair costs, and the like. Upon detecting that a vehicle has been in an accident (e.g., based on received sensor data analyzed in real-time) the system may identify a modification to an event processing device that may provide additional resources to address costs associated with the accident.

In addition, the system may continue to receive data and may analyze the data to determine whether a triggering event has occurred (e.g., a final bill, an indication of vehicle repair, or the like). Upon detection of a triggering event, the parameter may be further modified (e.g., to return the value to a permanent value).

As indicated above, various other example modifications and the like, may be identified and/or executed, without departing from the invention.

Figure 6:
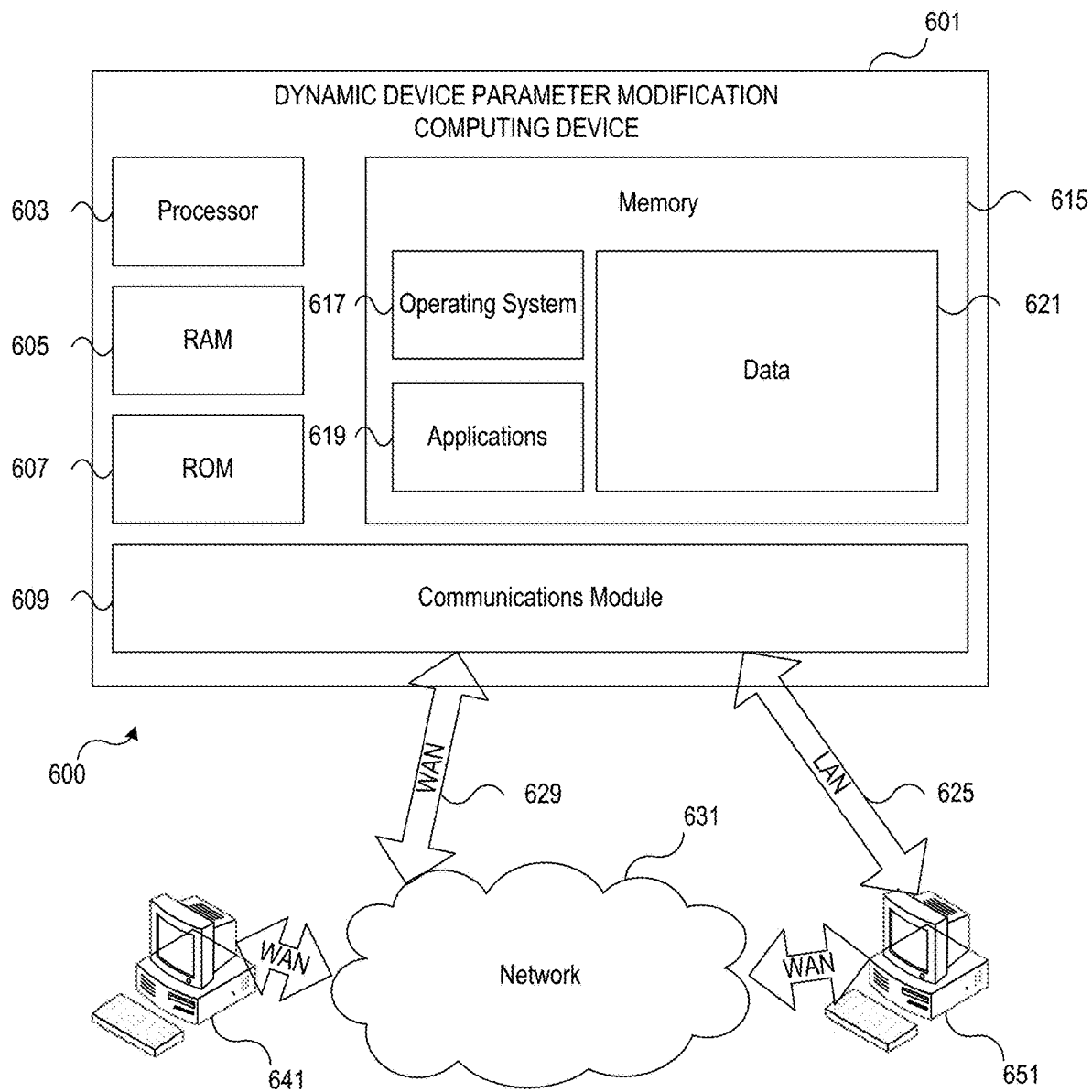
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic device parameter modification computing device 601 having processor 603 for controlling overall operation of dynamic device parameter modification computing device 601 and its associated components, including Random Access Memory (RAM) 605, Read-Only Memory (ROM) 607, communications module 609, and memory 615. Dynamic device parameter modification computing device 601 may include a variety of computer readable media. Computer readable media may be any available media that may be accessed by dynamic device parameter modification computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic device parameter modification computing device 601. Such a processor may execute computer-executable instructions stored on a computer-readable medium.

Software may be stored within memory 615 and/or storage to provide instructions to processor 603 for enabling dynamic device parameter modification computing device 601 to perform various functions as discussed herein. For example, memory 615 may store software used by dynamic device parameter modification computing device 601, such as operating system 617, application programs 619, and associated database 621. Also, some or all of the computer executable instructions for dynamic device parameter modification computing device 601 may be embodied in hardware or firmware. Although not shown, RAM 605 may include one or more applications representing the application data stored in RAM 605 while dynamic device parameter modification computing device 601 is on and corresponding software applications (e.g., software tasks) are running on dynamic device parameter modification computing device 601.

Communications module 609 may include a microphone, keypad, touch screen, and/or stylus through which a user of dynamic device parameter modification computing device 601 may provide input, and may also include one or more of a speaker for providing audio output and a video display device for providing textual, audiovisual and/or graphical output. Computing system environment 600 may also include optical scanners (not shown).

Dynamic device parameter modification computing device 601 may operate in a networked environment supporting connections to one or more remote computing devices, such as computing devices 641 and 651. Computing devices 641 and 651 may be personal computing devices or servers that include any or all of the elements described above relative to dynamic device parameter modification computing device 601.

The network connections depicted in FIG. 6 may include Local Area Network (LAN) 625 and Wide Area Network (WAN) 629, as well as other networks. When used in a LAN networking environment, dynamic device parameter modification computing device 601 may be connected to LAN 625 through a network interface or adapter in communications module 609. When used in a WAN networking environment, dynamic device parameter modification computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
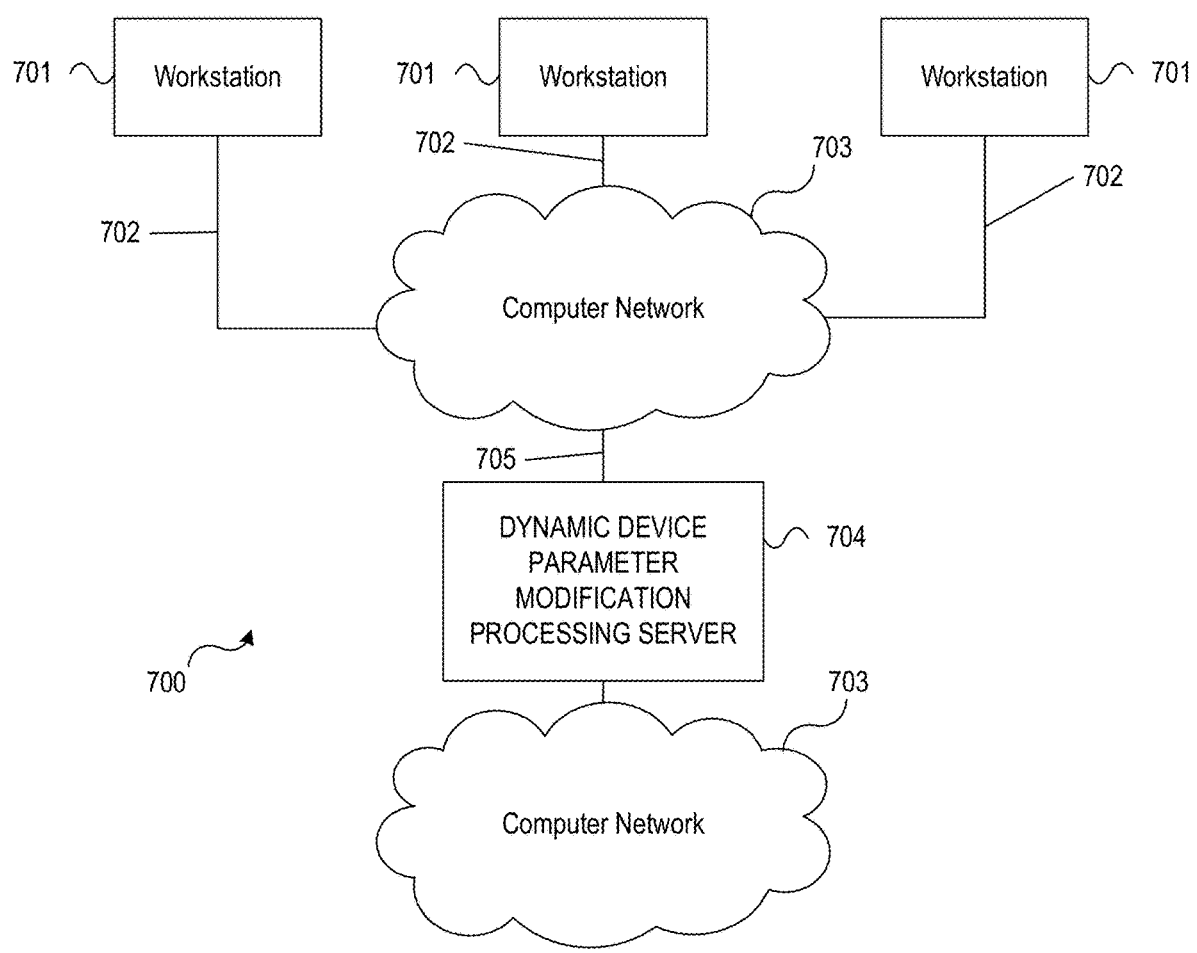
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic device parameter modification processing server 704. In system 700, dynamic device parameter modification processing server 704 may be a server, processor, computer, or data processing device, or combination of the same, configured to perform the functions and/or processes described herein. Server 704 may be used to receive data, determine one or more parameter modifications, generate instructions to modify parameters, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic device parameter modification processing server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic device parameter modification computing platform, comprising:
   at least one processor;
   a communication interface communicatively coupled to the at least one processor; and
   memory storing computer-readable instructions that, when executed by the at least one processor, cause the dynamic device parameter modification computing platform to:
   receive data from a computing device of a user;
   determine, based on one or more machine learning datasets and the received data, a modification to a parameter of a device;
   execute, based on the determined modification, an instruction to modify the parameter based on the determined modification, modifying the parameter including modifying the parameter from a first condition to a second condition;
   receive, in real-time, subsequent data from the computing device of the user;
   analyze, in real-time, the subsequent data;
   determine, based on the analyzed subsequent data, whether a triggering event has occurred;
   responsive to determining that the triggering event has occurred, executing an instruction to modify the parameter from the second condition to the first condition; and responsive to determining that a triggering event has not occurred:
  maintaining the second condition of the parameter;
  receive second subsequent data from the computing device of the user;
  determine, based on the second subsequent data and the one or more machine learning datasets, a second modification of the parameter from the second condition to a third condition different from the first condition and the second condition; and
  execute an instruction to modify the parameter from the second condition to the third condition.

2. The dynamic device parameter modification computing platform of claim 1, wherein the computing device of the user is a mobile computing device.

3. The dynamic device parameter modification computing platform of claim 2, wherein the received data from the mobile computing device of the user is current location data received from a global positioning system (GPS) in the mobile computing device of the user.

4. The dynamic device parameter modification computing platform of claim 1, wherein determining whether the triggering event has occurred includes determining whether a predetermined amount of time has elapsed.

5. The dynamic device parameter modification computing platform of claim 1, further including instructions that, when executed, cause the dynamic device parameter modification computing platform to:
  receive data from an internal data source; and
  wherein determining, based on one or more machine learning datasets and the received data, a modification to a parameter of a device is further based on the received data from the internal data source.

6. The dynamic device parameter modification computing platform of claim 1, further including instructions that, when executed, cause the dynamic device parameter modification computing platform to:
  receive data from an external data source; and
  wherein determining, based on one or more machine learning datasets and the received data, a modification to a parameter of a device is further based on the received data from the external data source.

7. A method, comprising:
  at a computing platform comprising at least one processor, memory, and a communication interface:
    receiving, by the at least one processor and via the communication interface, data from a computing device of a user;
    determining, by the at least one processor and based on one or more machine learning datasets and the received data, a modification to a parameter of a device;
    executing, by the at least one processor and based on the determined modification, an instruction to modify the parameter based on the determined modification, modifying the parameter including modifying the parameter from a first condition to a second condition;
    receiving, by the at least one processor, in real-time and via the communication interface, subsequent data from the computing device of the user;
    analyzing, by the at least one processor, in real-time, the subsequent data;
    determining, by the at least one processor, based on the analyzed subsequent data, whether a triggering event has occurred;
    responsive to determining that the triggering event has occurred, executing, by the at least one processor, an instruction to modify the parameter from the second condition to the first condition; and
    responsive to determining that a triggering event has not occurred:
      maintaining, by the at least one processor, the second condition of the parameter;
      receiving, by the at least one processor and via the communication interface, second subsequent data from the computing device of the user;
      determining, by the at least one processor and based on the second subsequent data and the one or more machine learning datasets, a second modification of the parameter from the second condition to a third condition different from the first condition and the second condition; and
      executing, by the at least one processor, an instruction to modify the parameter from the second condition to the third condition.

8. The method of claim 7, wherein the computing device of the user is a mobile computing device.

9. The method of claim 8, wherein the received data from the mobile computing device of the user is current location data received from a global positioning system (GPS) in the mobile computing device of the user.

10. The method of claim 7, wherein determining whether the triggering event has occurred includes determining whether a predetermined amount of time has elapsed.

11. The method of claim 7, further including:
  receiving, by the at least one processor and via the communication interface, data from an internal data source; and
  wherein determining, based on one or more machine learning datasets and the received data, a modification to a parameter of a device is further based on the received data from the internal data source.

12. The method of claim 7, further including:
  receiving, by the at least one processor and via the communication interface, data from an external data source; and
  wherein determining, based on one or more machine learning datasets and the received data, a modification to a parameter of a device is further based on the received data from the external data source.

13. One or more non-transitory computer-readable media storing instructions that, when executed by a computing platform comprising at least one processor, memory, and a communication interface, cause the computing platform to:
  receive data from a computing device of a user;
  determine, based on one or more machine learning datasets and the received data, a modification to a parameter of a device;
  execute, based on the determined modification, an instruction to modify the parameter based on the determined modification, modifying the parameter including modifying the parameter from a first condition to a second condition;
  receive, in real-time, subsequent data from the computing device of the user;
  analyze, in real-time, the subsequent data;
  determine, based on the analyzed subsequent data, whether a triggering event has occurred;
  responsive to determining that the triggering event has occurred, executing an instruction to modify the parameter from the second condition to the first condition; and responsive to determining that a triggering event has not occurred:
- maintain the second condition of the parameter;
- receive second subsequent data from the computing device of the user;
- determine, based on the second subsequent data and the one or more machine learning datasets, a second modification of the parameter from the second condition to a third condition different from the first condition and the second condition; and
- execute an instruction to modify the parameter from the second condition to the third condition.

14. The one or more non-transitory computer-readable media of claim 13, wherein the computing device of the user is a mobile computing device.

15. The one or more non-transitory computer-readable media of claim 14, wherein the received data from the mobile computing device of the user is current location data received from a global positioning system (GPS) in the mobile computing device of the user.

16. The one or more non-transitory computer-readable media of claim 13, wherein determining whether the triggering event has occurred includes determining whether a predetermined amount of time has elapsed.

17. The one or more non-transitory computer-readable media of claim 13, further including instructions that, when executed, cause the computing platform to:
- receive data from an internal data source; and
- wherein determining, based on one or more machine learning datasets and the received data, a modification to a parameter of a device is further based on the received data from the internal data source.

18. The one or more non-transitory computer-readable media of claim 13, further including instructions that, when executed, cause the computing platform to:
- receive data from an external data source; and
- wherein determining, based on one or more machine learning datasets and the received data, a modification to a parameter of a device is further based on the received data from the external data source.

* * * * *